(12) United States Patent
Shimanouchi et al.

(10) Patent No.: US 9,177,087 B1
(45) Date of Patent: Nov. 3, 2015

(54) METHODS AND APPARATUS FOR GENERATING SHORT LENGTH PATTERNS THAT INDUCE INTER-SYMBOL INTERFERENCE

(75) Inventors: Masashi Shimanouchi, San Jose, CA (US); Peng Li, Palo Alto, CA (US); Daniel Tun Lai Chow, Foster City, CA (US)

(73) Assignee: Altera Corporation, San Jose, CA (US)

( * ) Notice: Subject to any disclaimer, the term of this patent is extended or adjusted under 35 U.S.C. 154(b) by 587 days.

(21) Appl. No.: 13/289,785

(22) Filed: Nov. 4, 2011

(51) Int. Cl.
*G06G 7/48* (2006.01)
*G06F 17/50* (2006.01)
*G06G 7/63* (2006.01)

(52) U.S. Cl.
CPC .............. *G06F 17/5036* (2013.01); *G06G 7/63* (2013.01)

(58) Field of Classification Search
CPC .................. G01R 31/31708; G01R 31/31717; G01R 13/0272; G01R 19/2509; G01R 31/3016; G01R 31/31709; G01R 31/3171; G01R 31/31716; G01R 31/31725; G01R 31/318342; G01R 31/31924; G01R 31/31937; G06F 2217/82; G06F 17/5036; G06F 17/5018; G11C 2029/05; G11C 7/222; H04L 27/00; H04L 7/0004; H04L 7/0087; H04L 7/033; H04L 7/0331; H04L 7/0334; H04L 7/0337; H04L 7/043; H04L 7/10; G06G 7/63; G06G 6/635; G06G 7/62

USPC ............ 703/14, 15, 4, 19; 375/340, 219, 233; 702/79, 57
See application file for complete search history.

(56) References Cited

U.S. PATENT DOCUMENTS

| | | | | |
|---|---|---|---|---|
| 5,737,142 | A * | 4/1998 | Zook | 360/49 |
| 6,897,793 | B1 * | 5/2005 | Kim et al. | 341/59 |
| 7,272,756 | B2 | 9/2007 | Brink et al. | |
| 7,308,620 | B1 * | 12/2007 | Talbot | 714/707 |
| 7,509,608 | B1 * | 3/2009 | Duong | 716/113 |
| 7,836,363 | B2 | 11/2010 | Quinlan et al. | |
| 2008/0273584 | A1 * | 11/2008 | Dmitriev-Zdorov | 375/224 |
| 2009/0112551 | A1 * | 4/2009 | Hollis | 703/14 |
| 2009/0240448 | A1 * | 9/2009 | Liaw et al. | 702/57 |
| 2011/0188562 | A1 * | 8/2011 | Dmitriev-Zdorov | 375/228 |

OTHER PUBLICATIONS

Xiang, A.C., et al. Design and Verification of Bit Error Rate Tester in Altera FPGA for Optical Link Development, TWEPP-10, Aachen, Germany, Sep. 20-24, 2010.*

(Continued)

*Primary Examiner* — Kamini S Shah
*Assistant Examiner* — Scott S Cook
(74) *Attorney, Agent, or Firm* — Okamoto & Benedicto LLP

(57) ABSTRACT

One embodiment relates to a method of generating worst case inter-symbol interference (ISI) inducing short patterns for simulating and/or testing a communication link. The method includes the generation of a binary clock sequence comprising bits of alternating values at the beginning of the pattern. In addition, an ISI inducing binary sequences and its complement are generated after the clock sequence. Another embodiment relates to a pattern generator for generating an worst case inter-symbol interference inducing short pattern for testing a communication link. Other embodiments, aspects, and features are also disclosed.

15 Claims, 19 Drawing Sheets

500

(56) References Cited

OTHER PUBLICATIONS

Altera White Paper, Signal Integrity Comparisions Between Stratix II and Virtex-4 FPGAs, Altera Corporation, Mar. 2005, Ver. 1.0.*

Attarha, A., Testing Interconnetc for Noise and Skew in Gigahertz SoCs, ITC International Test Conference, IEEE, 2001 p. 305-314.*

Follow: definition, Webster's II New Riverside University Dictionary, 1994.*

Lida (8b/10b ISI Killer Pattern Presentation & Comparison with CJTPAT, Jan. 17, 2001 downloaded http://www.ieee802.org/3/ae/public/adhoc/serial_pmd/jitter_documents/testpat.pdf).*

IEEE Draft P802.3ae/D2.01 Draft Supplement Annex 48A Jan. 15, 2001.*

Shimanouchi, M., Worst-Case Patterns for High-Speed Simulation and Measurement, DesignCon 2011, Santa Clara, California, USA Jan. 31-Feb. 3, 2011 Proceedings.*

* cited by examiner

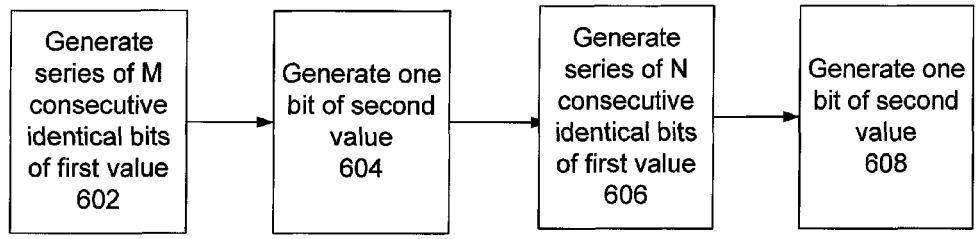
FIG. 6A    600
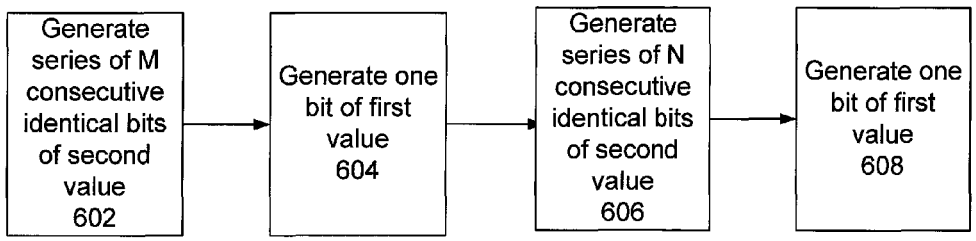
FIG. 6B    610

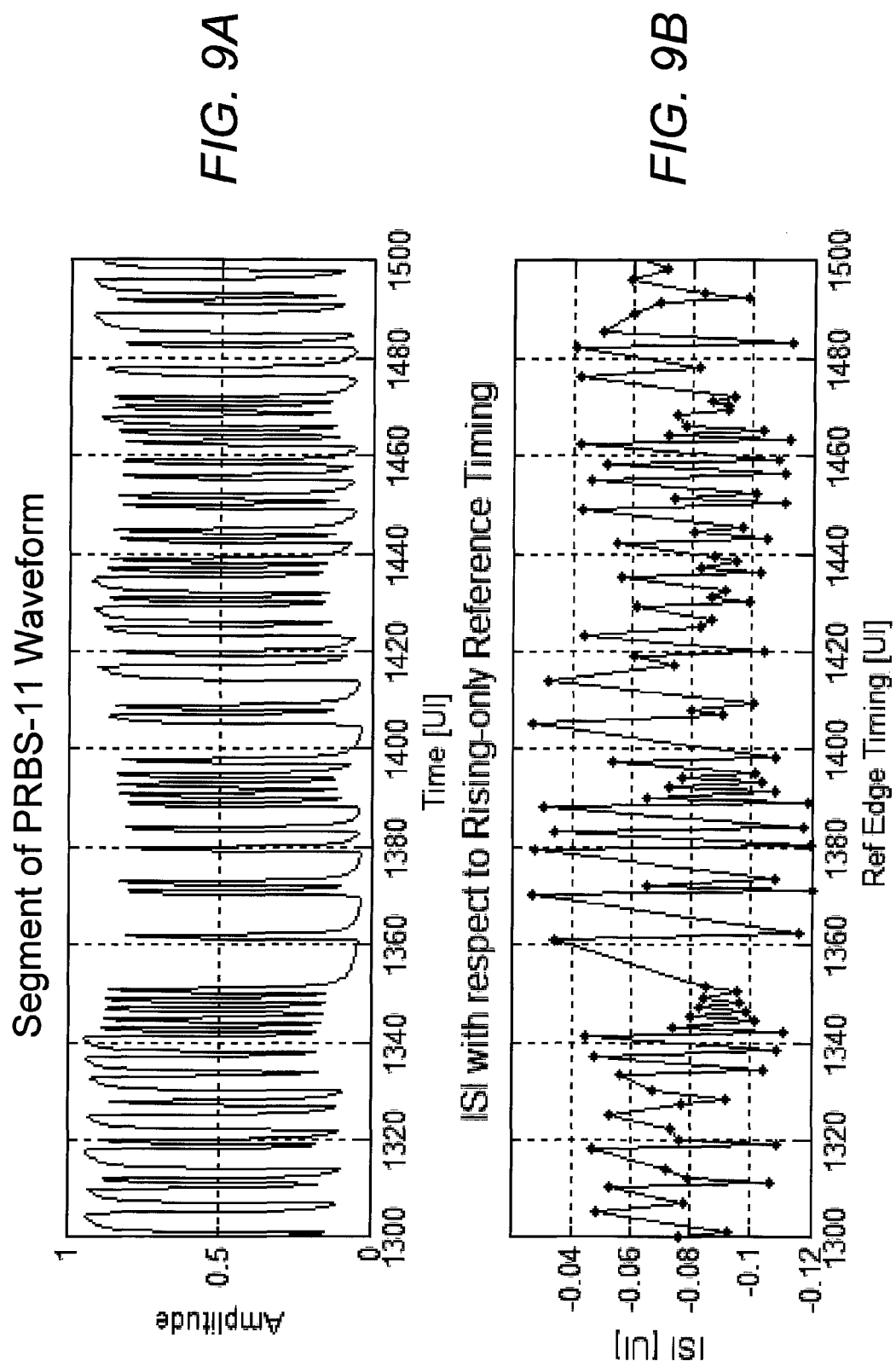

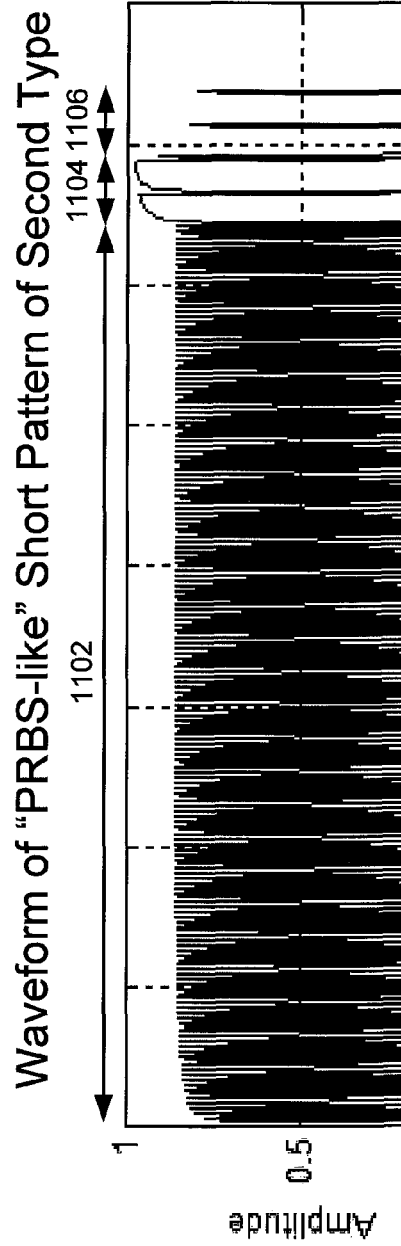
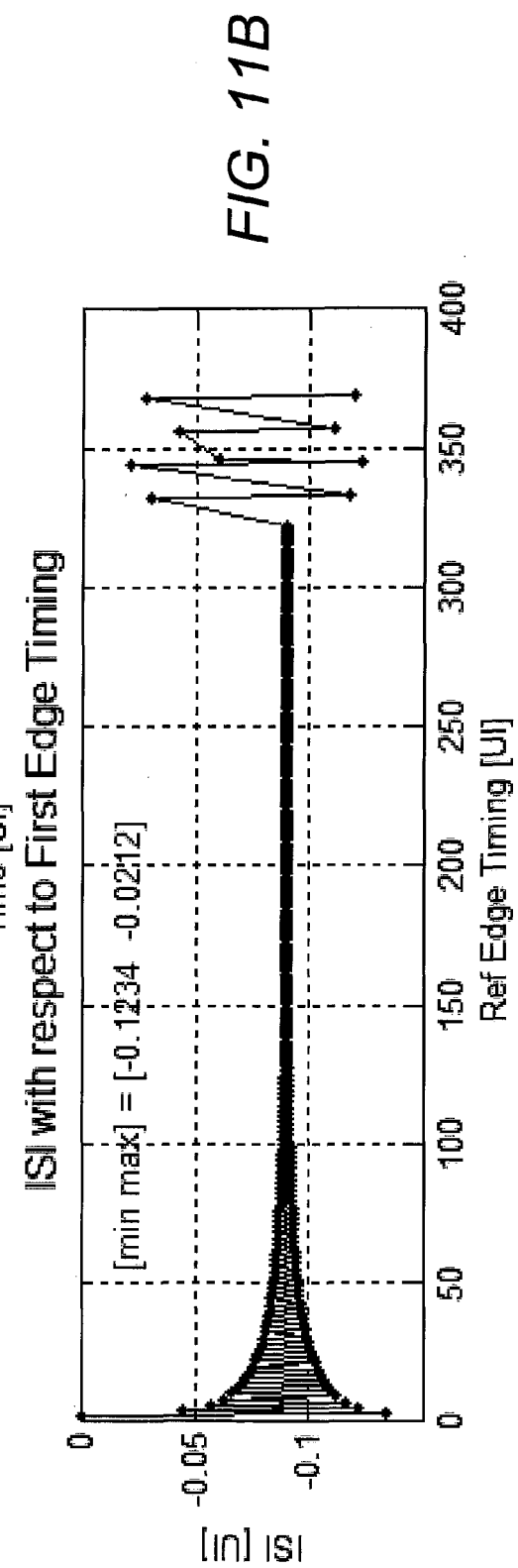

METHODS AND APPARATUS FOR GENERATING SHORT LENGTH PATTERNS THAT INDUCE INTER-SYMBOL INTERFERENCE

BACKGROUND

1. Technical Field

The present invention relates generally to communication links including, but not limited to, serial interfaces for integrated circuits.

2. Description of the Background Art

High-speed communication links using serial interface protocols are used to communicate data between devices in a system. Most multiple gigabit per second (Gbps) high-speed input/output (HSIO) links are serial where the bit clock is embedded in the transmitting data bit stream and gets recovered at the receiver through a clock and data recovery (CDR) circuit. Examples of industry-standard protocols for HSIO include those related to PCI Express® (Peripheral Component Interconnect Express), XAUI (X Attachment Unit Interface), sRIO (serial Rapid IO), and many others.

For copper-based serial links, the frequency dependent loss may become severe and various equalizations (EQs) may need to be invoked to compensate the high-frequency signal loss. Commonly used equalization techniques may include linear equalization and non-linear adaptive equalization. Examples of linear equalization include finite impulse response (FIR) and feed forward equalization (FFE). Examples of nonlinear adaptive equalization include decision feedback equalization (DFE) and infinite impulse response (IIR).

For an HSIO link, the dominant contributors to overall system BER are jitter and noise from all the subsystems of the link. In order to ensure interoperability, many high-speed link standards specify the signal waveform, eye diagram, jitter, and noise properties at the output of the transmitter and also specify the inputs of the receiver. In order to be certain that a device will work well when it is integrated and used in a system, a device may be simulated to verify that it passes the specification requirements.

The circuit simulator HSPICE may be used to simulate the operation of integrated circuits. The time to simulate an integrated circuit with HSPICE, however, may be very long, such that the simulation becomes somewhat impractical. HSPICE may take several hours or days to simulate transceiver circuit blocks with a data pattern which is of moderate length. For example, HSPICE may take many days to simulate transceiver circuit with a pseudorandom binary sequence (PRBS) of length ($2^{15}-1$) bits (which may be referred to as PRBS-15). A PRBS-15 data pattern is tens of thousands of bits long.

In order to reduce simulation time with increased coverage of the transceiver building blocks, a behavior-level simulator may be used. Behavior-level simulators include, for example, a pre-emphasis and equalization link estimator (PELE), and other simulators. Such a behavior-level simulator takes minutes to hours to simulate the performance of a HSIO link [including, for example, transceiver circuits and the channel medium (e.g., PCB trace, connectors, vias) in between] so as to determine a simulated eye diagram and BER for a moderate length data pattern.

While HSPICE and behavior-level simulation may be used for transceiver circuit simulation with moderate-length data patterns, it is not feasible to use HSPICE and behavior-level simulation for substantially longer data patterns, such as a PRBS31 data pattern, which is a PRBS of length ($2^{31}-1$) bits. A PRBS-31 data pattern is over a billion bits long and so would take a very long time to simulate. In addition, simulating a very long data pattern, such as PRBS-31, may be beyond the limited memory capabilities of the computer apparatus performing the simulation.

Another challenge in the simulation of high-speed links is how to obtain channel information. For example, channel S-parameters are usually measured by vector network analyzer (VNA), or simulated by an electromagnetic (EM) field solver. However, once network systems are deployed, the actual channels cannot be measured by VNA. Deployed channel information, such as an impulse or step response, may instead be measured with an embedded instrument such as on-die instrument (ODI). If the channel information is given, then behavior-level simulation, such as PELE, may be useful to fine-tune adaptively obtained channel equalizer settings, such as, for example, TX pre-emphasis, RX continuous-time linear equalization (CTLE) and DFE.

SUMMARY

One embodiment relates to a method of generating worst case inter-symbol interference (ISI) inducing short patterns for simulating and/or testing a communication link. The method includes the generation of a binary clock sequence comprising bits of alternating values at the beginning of the pattern. In addition, an ISI inducing binary sequences and its complement are generated after the clock sequence. Another embodiment relates to a pattern generator for generating an worst case inter-symbol interference inducing short pattern for testing a communication link. Other embodiments, aspects, and features are also disclosed. The ISI inducing short patterns provided by the present disclosure have superior scalability compared to PRBS data patterns. The ISI inducing short patterns may be used advantageously to simulate and/or measure performance of a communication link. The substantially shorter simulation and/or measurement times required by the ISI inducing short patterns enable the rapid determination of whether the link operates at the target performance level, and if not, enables fast debugging and trouble-shooting. It also enables rapid evaluation of what-if scenarios to find an optimized link design.

BRIEF DESCRIPTION OF THE DRAWINGS

FIGS. 6A and 6B are exemplary flow charts showing methods of generating first and second ISI inducing sequences so as to imitate a pseudo random binary sequence (PRBS) segment that induces a largest ISI in accordance with an embodiment of the invention.

FIG. 9A shows an exemplary segment of a PRBS-11 waveform in accordance with one embodiment of the present invention.

FIG. 9B shows an exemplary ISI corresponding to the segment of FIG. 9A.

FIG. 11A is an exemplary graph showing an ISI inducing pattern waveform of the second type so as to imitate a largest ISI portion of a PRBS in accordance with an embodiment of the invention.

FIG. 11B is an exemplary graph showing ISI for the waveform in FIG. 11A.

DETAILED DESCRIPTION

The present disclosure provides methods and apparatus which advantageously address simulation challenges for high-speed communication links. Furthermore, the present disclosure provides a self-contained high-speed equalization system which may be implemented as an on-chip solution.

Figure 1:
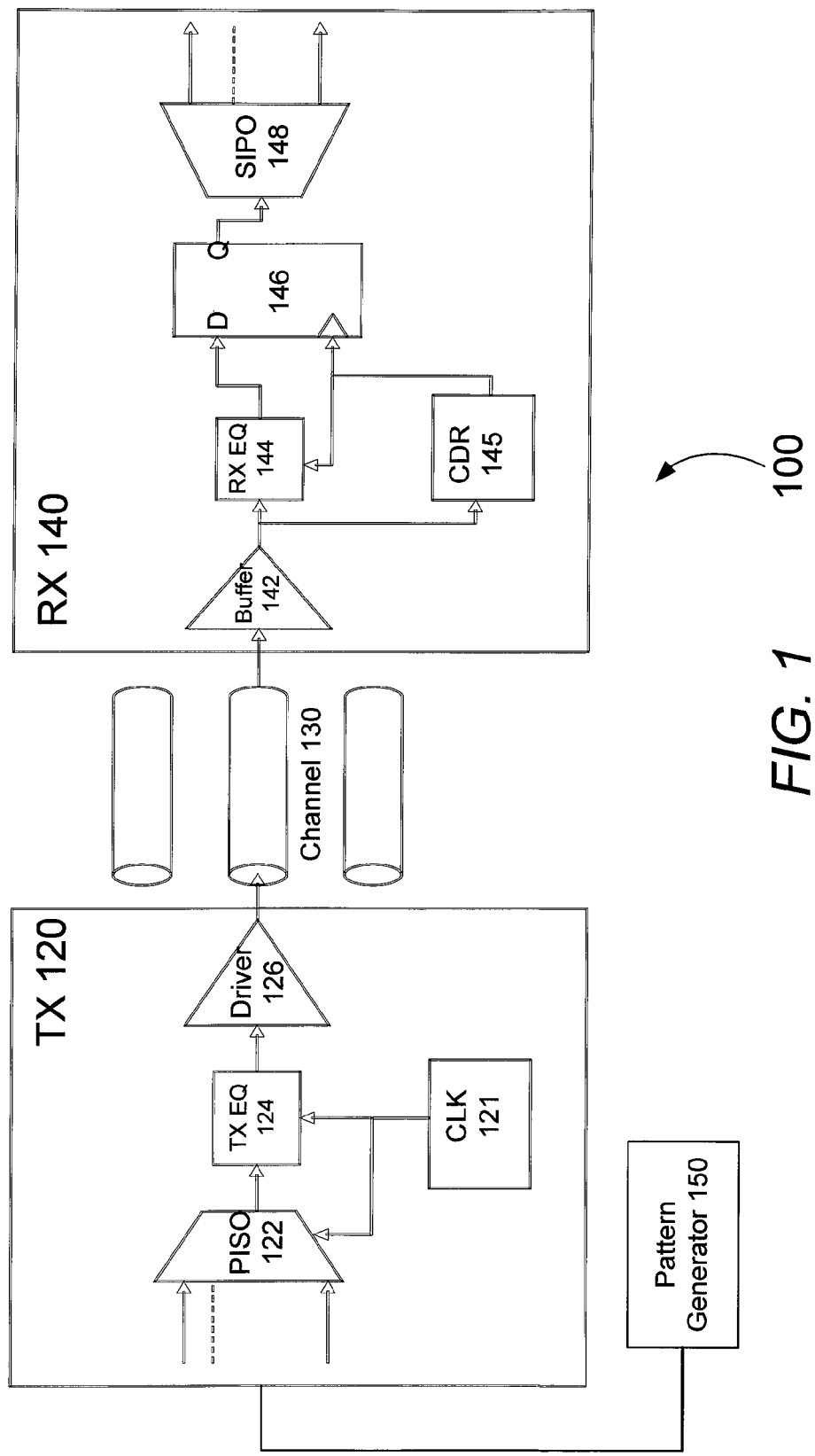
FIG. 1 is a high-level diagram of a communication link in accordance with an embodiment of the invention.

FIG. 1 is a high-level diagram of a communication link in accordance with an embodiment of the invention. As shown in FIG. 1, a communication link is generally composed of a transmitter (TX) 120, a receiver (RX) 140, and a communication channel (CH) 130 that is located in between the transmitter and the receiver.

The TX 120 may include a parallel-in-serial-out (PISO) circuit 122. The PISO (serializer) circuit 122 is configured to receive parallel data signals and convert it to a serial data signal. For example, the transmitter 120 may be part of an integrated circuit, and the parallel data signals may be provided by a communication protocol module in the integrated circuit.

The serial data signal may be adjusted by a transmitter equalizer (TX EQ) circuit 124. The TX EQ circuit 124 may be configured to perform one or more equalizations to compensate for high-frequency signal loss in the channel. Clock generator (CLK) circuit 121 may utilize a phase locked loop circuit to provide a clock signal to the PISO 122 and TX EQ 124 circuits. The output from the TX EQ 124 circuit may be provided to a driver circuit 126. The driver circuit 126 may be configured to transmit the serial data signal over the channel 130.

The channel 130 communicates the serial data signal from the transmitter 120 to the receiver 140. The channel 130 may use multiple lanes to communicate the serial data signal.

The receiver 140 may be configured to receive the transmitted serial data signal from the multiple-lane channel into buffer circuitry 142. The buffer circuitry 142 may output the received serial data signal to a receiver equalization (RX EQ) circuit 144 and also to a clock data recover (CDR) circuit 145. The CDR circuit 145 may use a PLL to recover the clock signal from the serial data signal. The recovered clock signal may be provided to the RX EQ circuit 144 and to a latch circuit 146. The RX EQ circuit 144 may be configured to perform one or more equalizations to compensate for high-frequency signal loss in the channel. More generally, the communication link may perform equalization using either a TX EQ circuit, or a RX EQ circuit, or both TX and RX EQ circuits.

The latch circuit 146 may be configured to receive the serial data signal from the RX EQ circuit 144 and to receive the recovered clock signal from the CDR circuit 145. The latch circuit 146 outputs the regenerated serial data signal to a serial-in-parallel-out (SIPO) circuit 148. The SIPO (deserializer) circuit 148 is configured to receive a serial data signal and convert it to parallel data signals. The parallel data signals may be provided to other circuitry of the receiving device. For example, the receiving device may be an integrated circuit, and the parallel data signals may be provided to a communication protocol module in the integrated circuit.

As further shown in FIG. 1, a pattern generator circuit 150 may be coupled to the TX 120. In accordance with an embodiment of the invention, the pattern generator circuit 150 may be configured to generate an inter-symbol interference (ISI) inducing short pattern as disclosed herein and described further below. Such an ISI inducing short pattern may be transmitted as a serial data signal by the TX 120 over the channel 130 to the RX 140. Performance of the link may be measured using, for example, on-die instrumentation. Advantageously, the link performance may be determined in a rapid manner due to the short length of the ISI inducing pattern, particularly in comparison to a much longer pseudorandom binary sequence which induces an equivalent amount of ISI.

Figure 2:
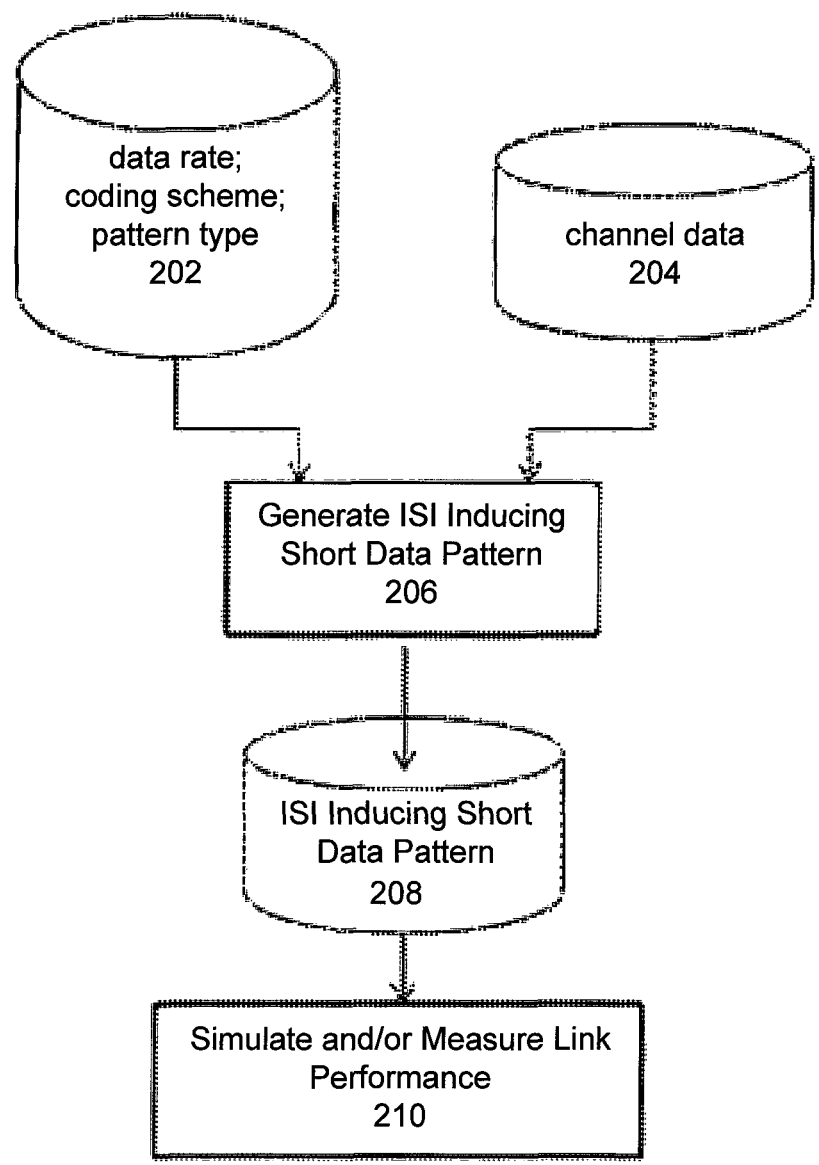
FIG. 2 is a high-level diagram depicting a method for the generation and use of an inter-symbol interference (ISI) inducing short pattern in accordance with an embodiment of the invention.

FIG. 2 is a high-level diagram depicting a method 200 for the generation and use of an ISI inducing short pattern in accordance with an embodiment of the invention. As shown, various data may be provided as inputs in order to generate 206 the ISI inducing short pattern 208. The data inputs may include a data rate of the communication link, a coding scheme used by the communication link, and a pattern type for the ISI inducing short pattern (202). Different pattern types for the ISI inducing pattern are disclosed herein and described further below. The data inputs may also include channel characterization information (channel data 204). The channel data 204 may be measured with a vector network analyzer (VNA) or time-domain reflectometry (TDR) and time-domain transmission (TDT), or simulated by an electromagnetic (EM) field solver, or measured by on-die instrumentation (ODI).

Figure 3:
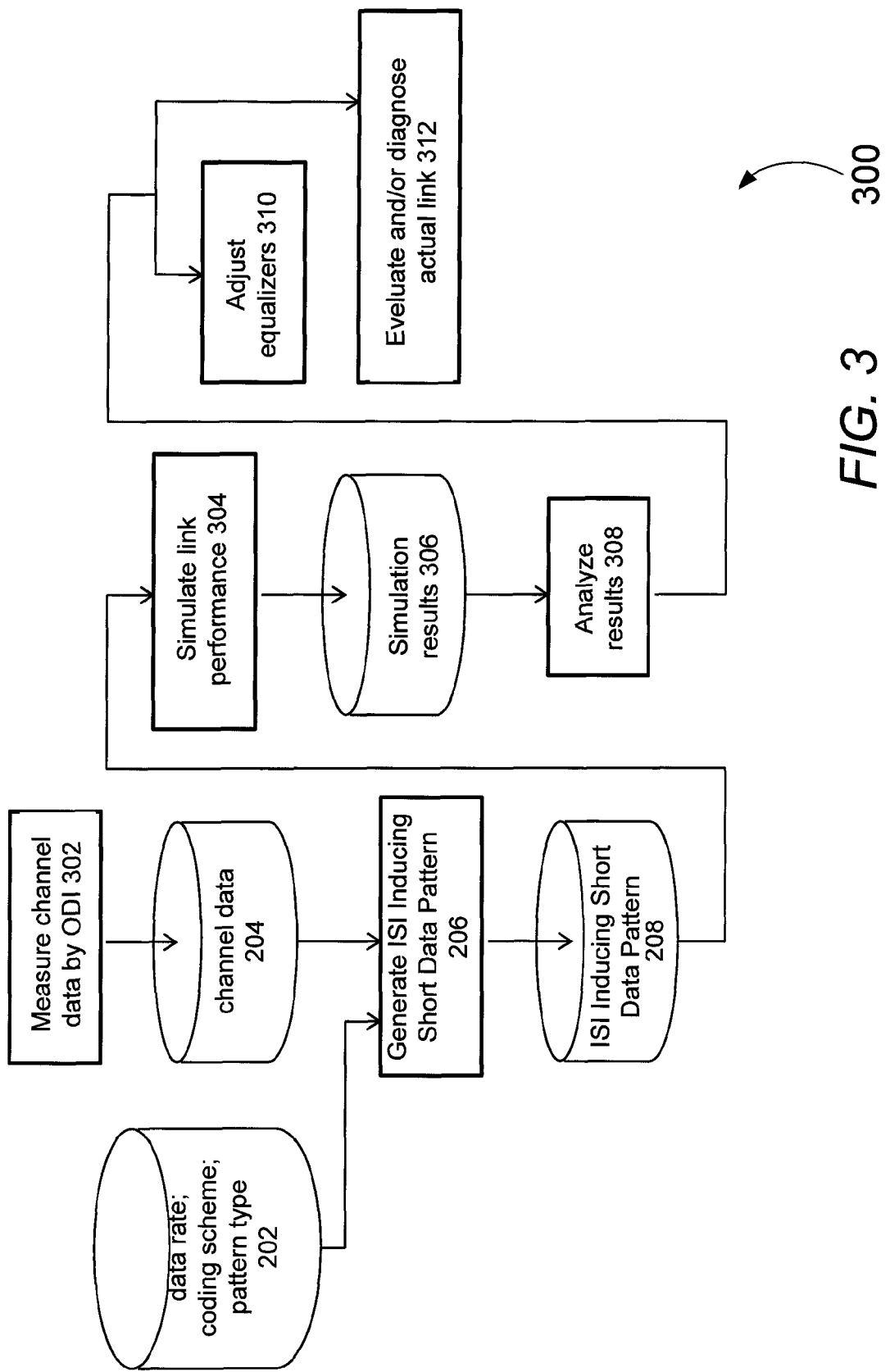
FIG. 3 is a high-level diagram depicting a method for the generation and use of an ISI inducing short pattern which utilizes on-chip circuitry in accordance with an embodiment of the invention.

Exemplary techniques for the generation 206 of the ISI inducing, short pattern 208 are described in detail below in relation to FIGS. 4 through 7. Advantageously, the ISI inducing short pattern 208 generated in accordance with this disclosure may be much shorter, by orders of magnitude, than an "equivalent" PRBS that induces a same or similar maximum level of ISI. The ISI inducing short pattern 208 may be used 210 for simulation and/or measurement of the communication link. The short length of the ISI inducing short pattern 208 makes simulation much more efficient and practical in that the simulation may be performed in much less time than a conventional simulation using an equivalent PRBS FIG. 3 is a high-level diagram depicting a method 300 for the generation and use of an ISI inducing short pattern which utilizes on-chip circuitry in accordance with an embodiment of the invention. Similar to the method 200 of FIG. 2, various data (202 and 204) may be provided as inputs in order to generate 206 the ISI inducing short pattern 208. In this case, the channel data 204 is shown as being measured 302 by on-die instrumentation (ODI). The measurement 302 of channel data by ODI is described further below in relation to FIG. 8. Techniques for the generation 206 of the ISI inducing short pattern are described in detail below in relation to FIGS. 4 through 7.

In this embodiment, the ISI inducing short pattern 208 is used to simulate 304 performance of the communication link. The simulation 304 may be performed, for example, using HSPICE simulation or behavior-level simulators. The short length of the ISI inducing short pattern 208 makes the simulation efficient and practical. In comparison, a simulation with a PRBS which causes a similar maximal level of ISI is much longer and would take a substantially longer time to simulate.

As further shown in FIG. 3, the simulation results 306 may then be analyzed 308 to determine if adjustment of the equalizer settings is desirable. The equalizer settings may be adjusted 310, if needed, so as to fine tune compensation for high-frequency loss on the channel. In addition, the results of the analysis may be used to evaluate and/or diagnose 312 the actual high-speed link performance for the deployed interconnect and network systems. When a change in the link performance occurs, the process 300 shown in FIG. 3 may be repeated. For example, the change in link performance may comprise an increase in the BER for the link.

Figure 4:
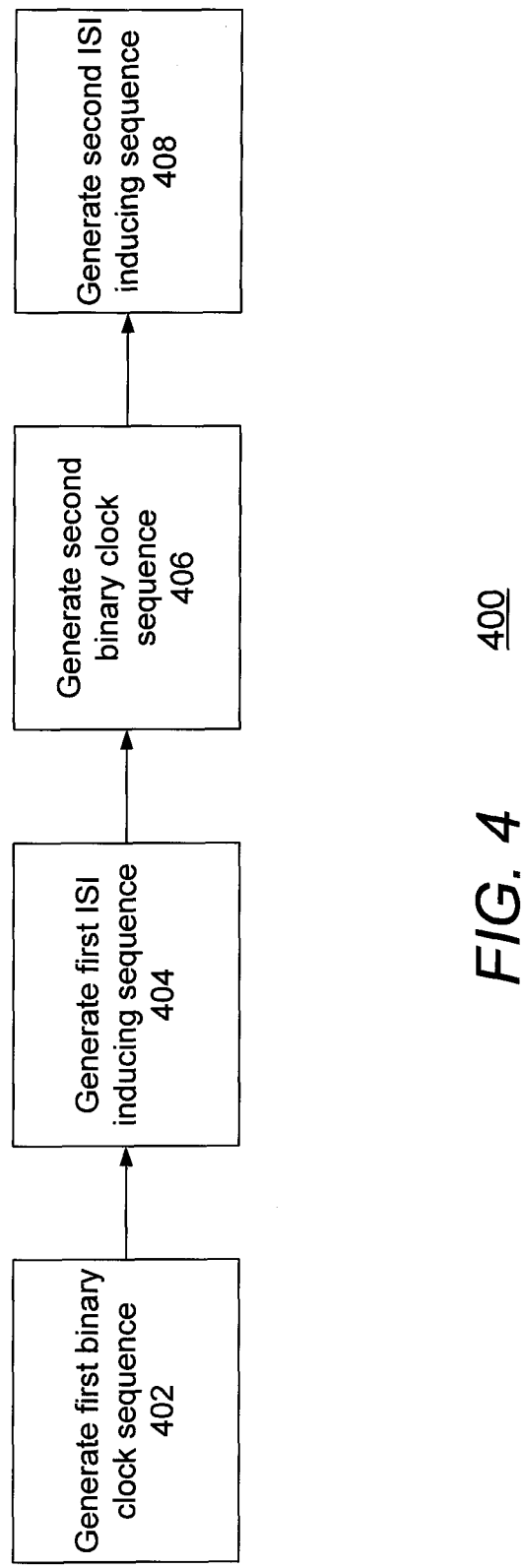
FIG. 4 is an exemplary flow chart of a method of generating an ISI inducing short pattern of a first type in accordance with an embodiment of the invention.

FIG. 4 is an exemplary flow chart of a method 400 of generating an ISI inducing short pattern of a first type in accordance with an embodiment of the invention. A method 700 of generating an ISI inducing short pattern of a second type is described below in relation to FIG. 7 in accordance with another embodiment of the invention. These methods (400 and 700) generate very small data patterns which may be orders of magnitude smaller than "equivalent" PRBS which generate a similar maximum level of ISI.

Returning to FIG. 4, per block 402, a first binary clock sequence may be generated. In an exemplary implementation, the first binary clock sequence may be a sequence of alternating bit values which is an odd number of bits long. Furthermore, the length L of the first binary clock sequence may be greater than or equal to (i.e. at least) the channel settling time in unit intervals divided by the one bit duration in unit intervals. A unit interval (UI) is also known as the symbol duration time. In equation form, L≥Tsettle[UI]/Tbit[UI], where Tsettle[UI] is the channel settling time in UI, Tbit[UI] is the bit duration time in UI, and L may be an odd number.

The clock length L may be less than one thousand, for example. As a simple example for illustrative purposes, if L=7, then the first binary clock sequence may be 1010101 or 0101010.

Figure 8:
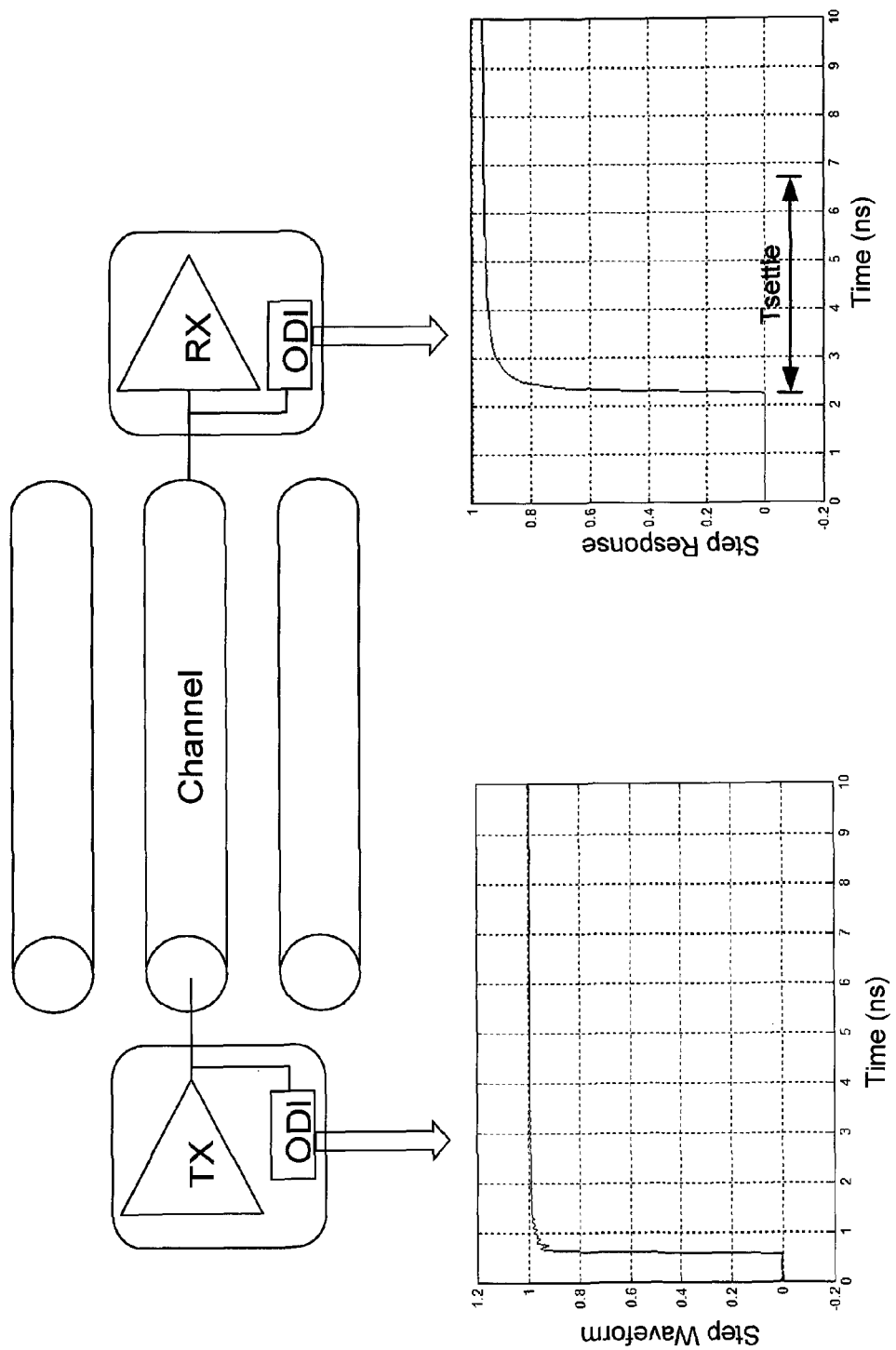
FIG. 8 is a diagram depicting one technique of obtaining channel data in accordance with an embodiment of the invention.

The particular value of L will depend on the characteristics of the particular channel, such as the channel settling time. An exemplary technique for measuring the channel settling time using on-die instrumentation is depicted in FIG. 8. As depicted in FIG. 8, on-die instrument (ODI) circuitry may be coupled to the transmitter (TX) and the receiver (RX) circuits. The ODI circuitry at the transmitter may be used to send a step waveform, an example of which is shown on the bottom left of FIG. 8. The ODI circuitry at the receiver may be used to receive and analyze a step response, an example of which is shown on the bottom right of FIG. 8. As seen, the step response has a settling time (Tsettle) before the step response reaches an equilibrium (or near equilibrium) level. The settling time will depend on the communication channel between the TX and the RX. The channel settling time determined by the ODI circuitry may be used in determining a minimum length for the binary clock sequences used for pre-conditioning the link in the above-described ISI inducing short patterns.

Returning to FIG. 4, per block 404, after the first binary clock sequence, the data pattern generation continues with the generation of a first ISI inducing sequence. Different kinds of ISI inducing sequences are disclosed herein.

In accordance with one embodiment, the first ISI inducing sequence imitates (models) a "worst-case" scenario (i.e. a scenario which results in a maximum level of ISI for a given N). The generation of the first worst-case sequence is described further below in relation to FIG. 5A.

In accordance with another embodiment, the first ISI inducing sequence is "PRBS-like" in that it imitates (models) a segment of PRBS-N that causes a largest ISI. The generation of the first "PRBS-like" sequence is described further below in relation to FIG. 6A.

An exemplary segment of a PRBS that causes a largest ISI is shown in FIG. 9A in accordance with one embodiment of the invention. Shown in FIG. 9A, in particular, is an exemplary segment of a PRBS-11 waveform which induces or causes a largest ISI for a link. The corresponding ISI is shown in the exemplary graph of FIG. 9B. The ISI in FIG. 9B is shown with respect to rising-only reference timing.

Returning to FIG. 4, per block 406, after the first ISI inducing sequence, the data pattern generation continues with the generation of a second binary clock sequence. In an exemplary implementation, the second binary clock sequence is complementary to the first binary clock sequence. In other words, the second binary clock sequence is the same clock length L as the first binary clock sequence, but it has inverse values in comparison to the first binary clock sequence. Consider the simple example where L=7: if the first binary clock sequence is 1010101, then the second binary clock sequence is 0101010 (and vice versa).

Per block 408, after the second binary clock sequence, the data pattern generation continues with the generation of a second ISI inducing sequence. In an exemplary implementation, the second ISI inducing sequence is complementary to the first ISI inducing sequence. If the first ISI inducing sequence imitates a "worst case" scenario per FIG. 5A, then the second ISI inducing sequence is a complementary sequence per FIG. 5B. If the first ISI inducing sequence imitates a PRBS segment that induces a largest ISI per FIG. 6A, then the second ISI inducing sequence is a complementary sequence per FIG. 6B.

Figure 5A:
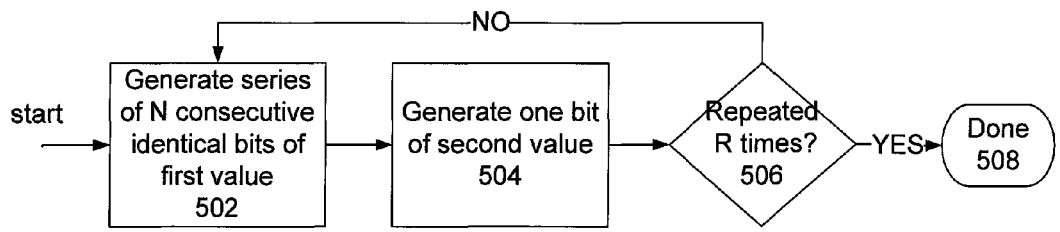
FIGS. 5A and 5B are exemplary flow charts showing methods of generating first and second ISI inducing sequences so as to imitate a worst-case scenario in accordance with an embodiment of the invention.
Figure 5B:
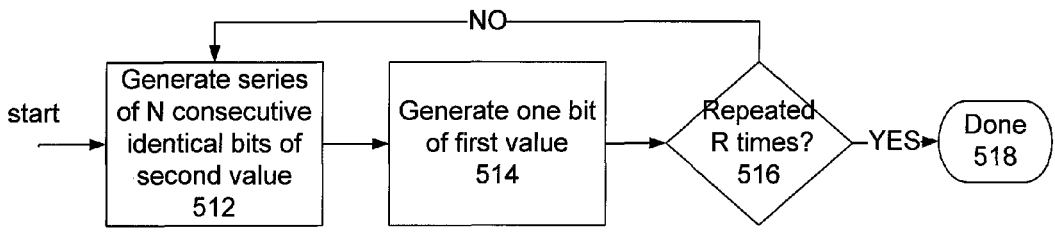

FIGS. 5A and 5B are exemplary flow charts showing methods of generating first and second ISI inducing sequences, respectively, so as to imitate a worst-case scenario in accordance with an embodiment of the invention. The method 500 of FIG. 5A generates the first ISI inducing sequence may be used for step 404 in the method 400 of FIG. 4. The method 510 of FIG. 5B generates the second ISI inducing sequence and may be used for step 408 in FIG. 4.

The method 500 of FIG. 5A begins at step 502. Per step 502, a series of N consecutive identical bits (or consecutive identical digits or CID) of a first value are generated. Next, per step 504, one bit of a second value is generated, where the first and second values are complements (inverses) of each other (i.e. if the first value is one, then the second value is zero, or vice versa).

A determination may then be made per step 506 as to whether or not R repetitions of the steps 502 and 504 have been made. If not, then the method 500 loops back to step 502. Once R repetitions have been made, then the generation of the first ISI inducing sequence is done per block 508.

In accordance with one embodiment, the value of N (i.e. the number of CID) may be determined to be the maximum number of CID that is allowed under the coding scheme of the link. In an exemplary implementation, the value of R (i.e. the number of repetitions) may be greater than or equal to (i.e. at least) a nearest integer which is greater than or equal to the clock length L in bits divided by one more than the length N in bits. In equation form, $R \geq \text{ceil}(L/(N+1))$, where ceil (m/n) =nearest integer which is greater than or equal to m/n.

Similarly, the method 510 of FIG. 5B begins at step 512. Per step 512, a series of N consecutive identical bits (or consecutive identical digits or CID) of the second value are generated. Next, per step 514, one bit of the first value is generated, where the first and second values are the same as were used in the method 500 of FIG. 5A. A determination may then be made per step 516 as to whether or not R repetitions of the steps 512 and 514 have been made. If not, then the method 510 loops back to step 512. Once R repetitions have been made, then the generation of the second ISI inducing sequence is done per block 518. The values of N and R are also the same as used in the method 500 of FIG. 5A.

Hence, the "worst-case" ISI inducing short pattern of the first type (which induces a maximal ISI for a given N) may be generated using the method 400 of FIG. 4 with steps 404 and 408 implemented by the methods 500 and 510 of FIGS. 5A and 5B, respectively. Consider the simple example with L=7, N=5, and R=2. In this case, the "worst-case" ISI inducing short pattern of the first type would be either "0101010"+ "111110"+"111110"+"1010101"+"000001"+"000001", or its complement which is "1010101"+"000001"+"000001"+ "0101010"+"111110"+"111110". Note that, in this disclosure, the "+" sign between sequences of bits indicates that the sequences are to be strung together. Hence, for example, "001"+"110"="001110". As another example, "0101010"+ "111110"+"111110"+"1010101"+"000001"+"000001"= "010101011111101111101010101000001000001".

FIGS. 6A and 6B are exemplary flow charts showing a method of generating first and second ISI inducing sequences, respectively, so as to imitate a PRBS segment that induces a largest ISI in accordance with an embodiment of the invention. The method 600 of FIG. 6A generates the first ISI inducing sequence and may be used for step 404 in the method 400 of FIG. 4. The method 610 of FIG. 6B generates the second ISI inducing sequence and may be used for step 408 in the method 400 of FIG. 4.

The method 600 of FIG. 6A begins at step 602. Per step 602, a series of M consecutive identical bits (or consecutive identical digits or CID) of a first value are generated. Next, per step 604, one bit of a second value is generated, where the first and second values are complements (inverses) of each other (i.e. if the first value is one, then the second value is zero, or vice versa). Subsequently, per step 606, a series of N CID of the first value are generated. Next, per step 608, one bit of the second value is generated.

In accordance with an embodiment of the invention, the values of N and M may be determined by analysis of the ISI induced by a long PRBS transmitted over the link. In particular, the length N of the second CID sequence may be found by focusing on the segment of the PRBS that generates a largest ISI and finding the length of a sequence of consecutive identical bits that precedes the largest ISI. In an exemplary implementation, the length M of the first CID sequence may be less than or equal to N. In general, M=N−2 works well.

Similarly, the method 610 of FIG. 6B begins at step 612. Per step 612, a series of M CID of the second value are generated. Next, per step 614, one bit of the first value is generated, where the first and second values are the same as were used in the method 600 of FIG. 6A Subsequently, per step 616, a series of N CID of the second value are generated. Next, per step 608, one bit of the first value is generated. The values of M and N are also the same as used in the method 600 of FIG. 6A.

Hence, a PRBS-level worst-case ("PRBS-like") ISI inducing short pattern of the first type may be generated using the method 400 of FIG. 4 with steps 404 and 408 implemented by the methods 600 and 610 of FIGS. 6A and 6B, respectively. The PRBS-like short pattern imitates a segment of PRBS-N that induces a largest ISI. Consider the simple example with L=7, N=5, and M=3. In this case, the "PRBS-like" ISI inducing short pattern of the first type would be either "0101010"+ "1110"+"111110"+"1010101"+"0001"+"000001", or its complement which is "1010101"+"0001"+"000001"+"0101010"+"1110"+"111110".

Note that the above discussion of ISI inducing short patterns assumes (1) the same polarities for all cursors, and (2) no pre-cursor, to simplify the explanation. In practice, it is desirable to take into account the polarities of the cursors and the existence of a non-zero pre-cursor, if any. The adjustments to be made depending on these two characteristics are described further below in relation to FIGS. 14 through 16.

Figure 7:
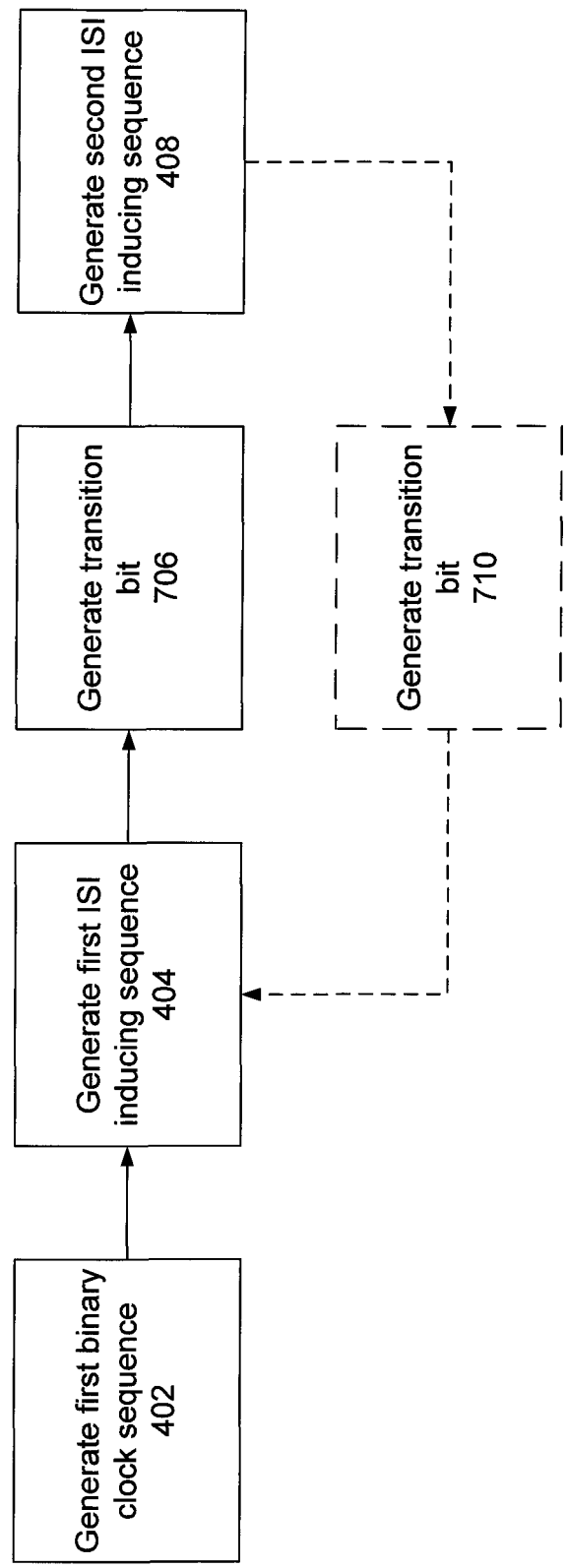
FIG. 7 is an exemplary flow chart of a method of generating an ISI inducing short pattern of a second type in accordance with an embodiment of the invention.

FIG. 7 is an exemplary flow chart of a method 700 of generating an ISI inducing short pattern of a second type in accordance with an embodiment of the invention. The method 700 of FIG. 7 is similar to the method 400 of FIG. 4. The primary difference is that, instead of generating the second binary clock sequence per step 406 of FIG. 4, a single transition bit is generated in step 706 of FIG. 7. The transition bit is of the first value such that it is in between and complementary to both the last bit of the first ISI inducing sequence and the first bit of the second ISI inducing sequence. In addition, FIG. 7 shows that, after step 408, it may be optional to loop back to step 404 and continue the pattern. In that case, a transition bit of the second value is generated 710 between step 408 and 404.

A "worst-case" ISI inducing short pattern of the second type (which induces a maximal ISI for a given N) may be generated using the method 700 of FIG. 7 with steps 404 and 408 implemented by the methods 500 and 510 of FIGS. 5A and 5B, respectively. Consider the simple example with L=7, N=5, and R=2. In this case, the "worst-case" ISI inducing short pattern of the second type would be either "0101010"+ "111110"+"111110"+"1"+"000001"+"000001", or its complement which is "1010101"+"000001"+"000001"+"0"+"111110"+"111110".

Hence, a "PRBS-like" ISI inducing short pattern of the second type (which imitates a segment of PRBS-N that induces a largest ISI) may be generated using the method 700 of FIG. 7 with steps 404 and 408 implemented by the methods 600 and 610 of FIGS. 6A and 6B, respectively. Consider the simple example with L=7, N=5, and M=3. In this case, the "PRBS-like" ISI inducing short pattern of the second type would be either "0101010"+"1110"+"111110"+"1"+"0001"+"000001", or its complement which is "1010101"+"0001"+"000001"+"0"+"1110"+"111110".

Figure 10A:
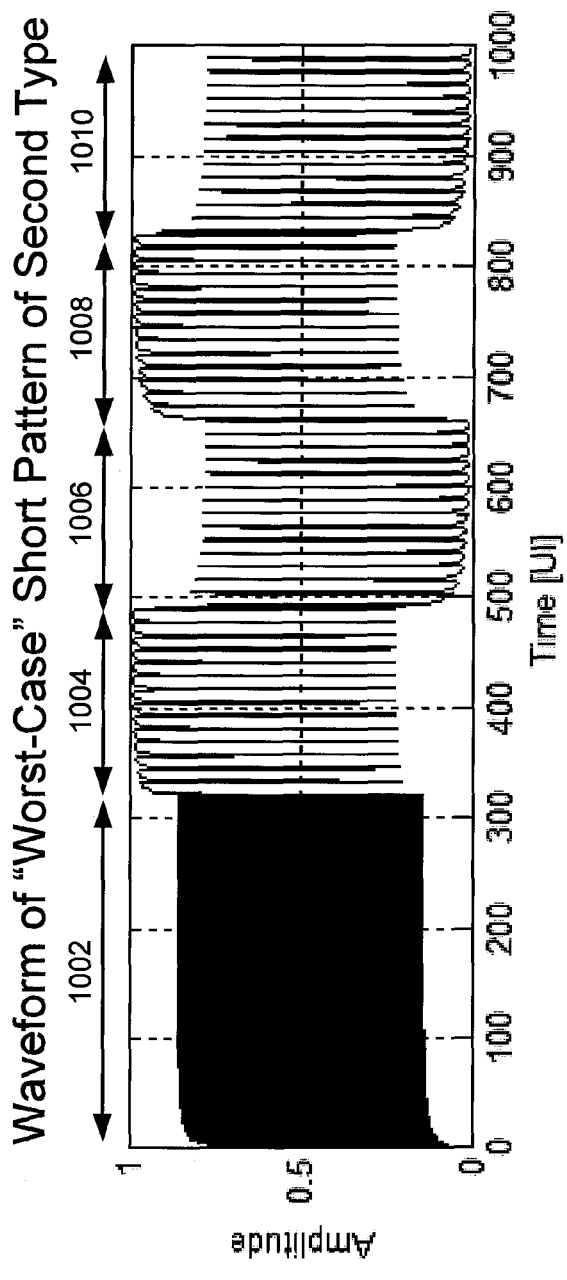
FIG. 10A is an exemplary graph showing an ISI inducing pattern waveform of the second type so as to imitate a worst case scenario in accordance with an embodiment of the invention.
Figure 10B:
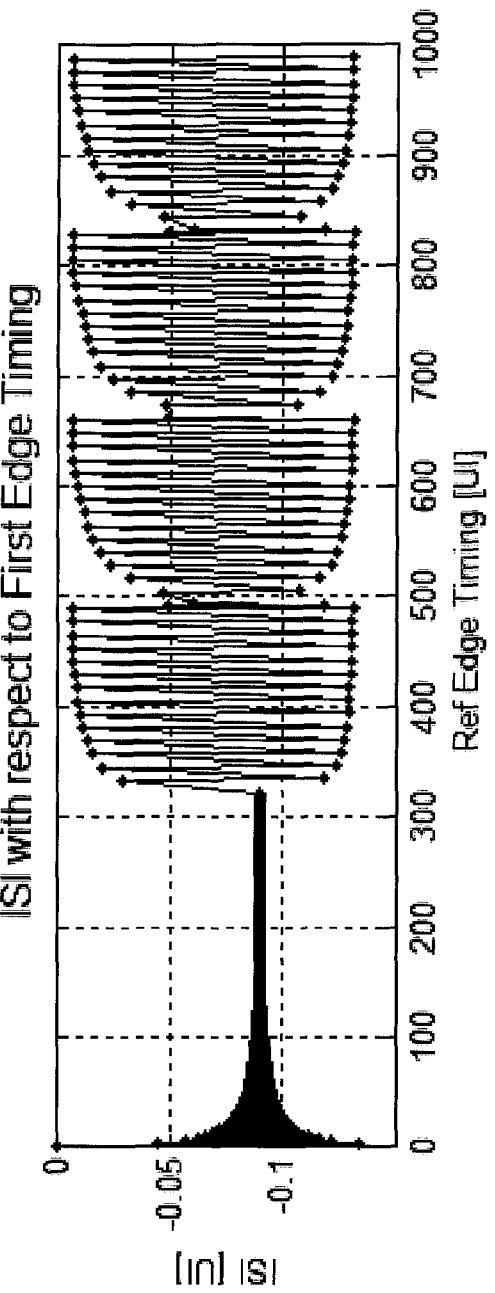
FIG. 10B is an exemplary graph showing ISI for the waveform in FIG. 10A.

An exemplary waveform of an ISI inducing short pattern is shown in FIG. 10A. In particular, FIG. 10A shows an exemplary waveform of a "worst-case" ISI inducing short pattern of the second type. The corresponding ISI is shown in the exemplary graph in FIG. 10B. The ISI in FIG. 10B is shown with respect to first edge timing.

A first segment 1002 of the pattern in FIG. 10A corresponds to the generation of the first binary clock sequence per step 402 in FIG. 7. As seen in FIG. 10B, the ISI becomes low during this segment.

The second segment 1004 of the pattern in FIG. 10A corresponds to the generation of the first ISI inducing sequence per step 404 of FIG. 7 (and the method 500 of FIG. 5A). As seen in FIG. 10B, a large amount of ISI is induced during this segment.

The third segment 1006 of the pattern in FIG. 10A corresponds to the generation of the second ISI inducing sequence per step 408 of FIG. 7 (and the method 510 of FIG. 5B). As seen in FIG. 10B, a large amount of ISI is also induced during this segment.

The fourth segment 1008 is an optional repeat of the second segment 1004. The fifth segment 1010 is an optional repeat of the third segment 1006. Also, note that there is a transition bit per step 706 in FIG. 7 in between the second 1004 and third 1006 segments (and also in between the fourth 1008 and fifth 1010 segments).

Figure 10C:
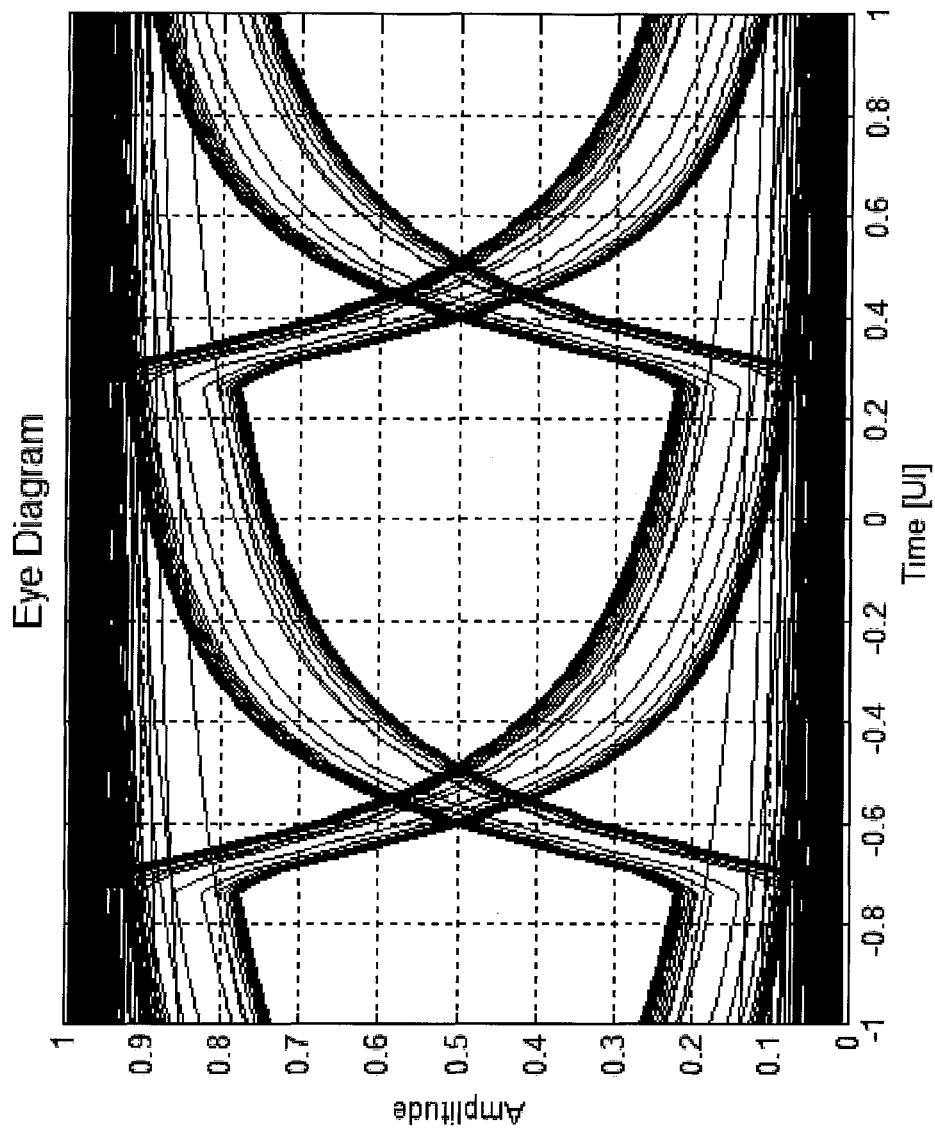
FIG. 10C is an exemplary eye diagram relating to the waveform in FIG. 10A.

FIG. 10C is an exemplary eye diagram relating to the worst-case short-pattern waveform in FIG. 10A. As is known, the eye diagram provides various information about the performance of the link during the transmission of the waveform of FIG. 10A.

Another exemplary waveform of an ISI inducing short pattern is shown in FIG. 11A. In particular, FIG. 11A shows an exemplary waveform of a "PRBS-like" ISI inducing short pattern of the second type. The corresponding ISI is shown in FIG. 11B. The ISI in FIG. 11B is with respect to first edge timing.

A first segment 1102 of the pattern in FIG. 11A corresponds to the generation of the first binary clock sequence per step 402 in FIG. 7. As seen in FIG. 11B, the ISI becomes low during this segment.

The second segment 1104 of the pattern in FIG. 11A corresponds to the generation of the first ISI inducing sequence per step 404 of FIG. 7 (and the method 600 of FIG. 6A). As seen in FIG. 11B, a large amount of ISI is ISI is induced during this segment.

The third segment 1106 of the pattern in FIG. 11A corresponds to the generation of the second ISI inducing sequence per step 408 of FIG. 7 (and the method 610 of FIG. 6B). As seen in FIG. 11B, a large amount of ISI is also induced during this segment.

Figure 11C:
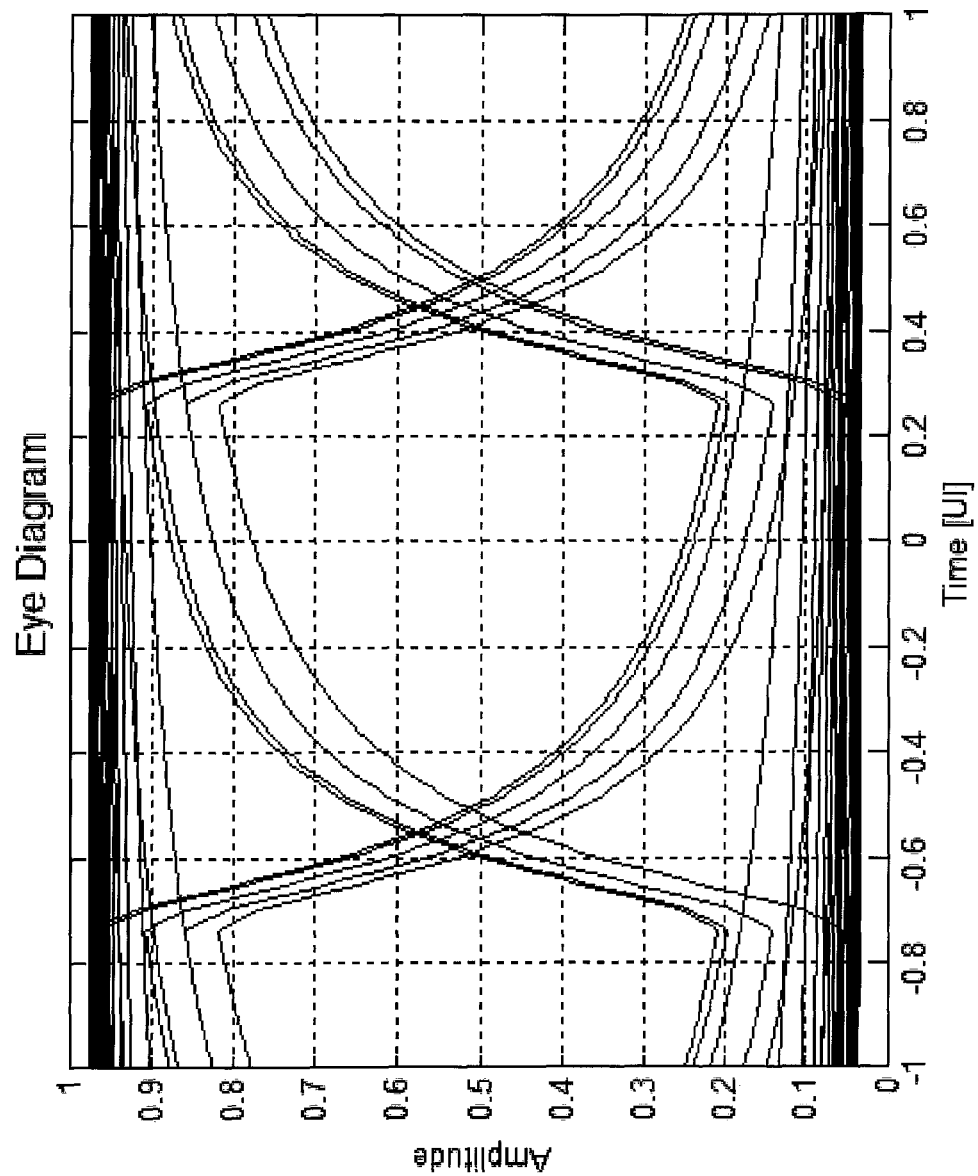
FIG. 11C is an exemplary eye diagram relating to the waveform in FIG. 11A.

FIG. 11C is an eye diagram relating to the PRBS-like short-pattern waveform in FIG. 11A. As is known, the eye diagram provides various information about the performance of the link during the transmission of the waveform of FIG. 11A.

Figure 12:
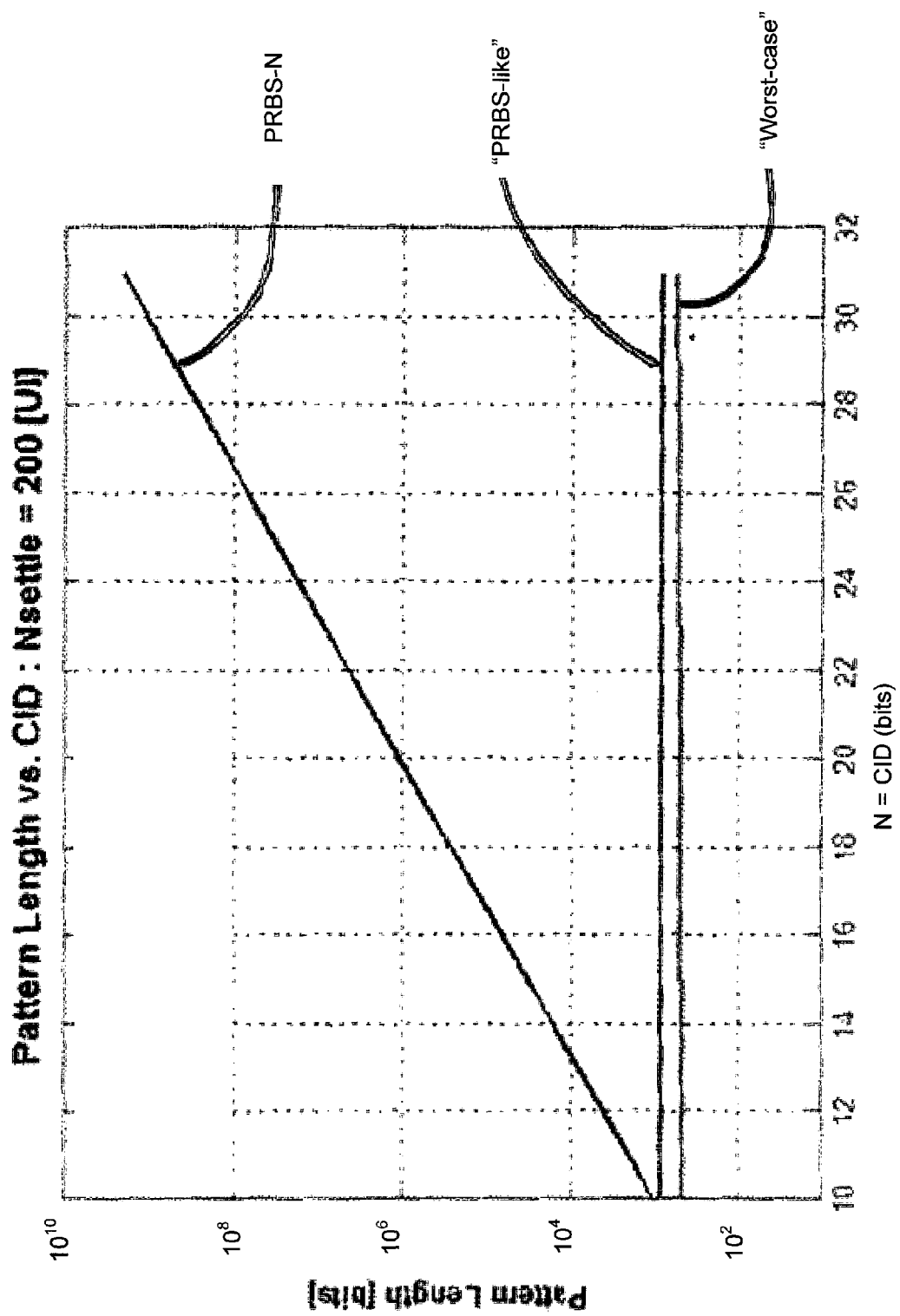
FIG. 12 is an exemplary log scale graph of pattern lengths which shows the superior scalability of the ISI inducing short patterns generated in accordance with embodiments of the invention.

FIG. 12 is an exemplary log scale graph of pattern lengths which shows the superior scalability of the ISI inducing short patterns generated in accordance with embodiments of the invention. In this example, 400 bits of "padding" (i.e. 400 bits before or between the ISI inducing sequences) were used for the PRBS-like and "worst-case" short patterns.

As seen in the exemplary graph in FIG. 12, as N increases, the length of PRBS-N increases exponentially and is over one billion ($10^9$) bits long for PRBS-31. In contrast, the length of the PRBS-like and worst-case ISI inducing short patterns appears nearly constant in the log-scale graph because they increase only linearly with N.

The superior scaling of the ISI inducing short patterns is a substantial advantage. The superior scaling allows ISI inducing short patterns which are "equivalent" to very long PRBS patterns to be simulated and/or transmitted in a much shorter time period so as to become practical. The shorter pattern lengths also enable rapid isolation and/or diagnosis of ISI subcomponents.

Figure 13:
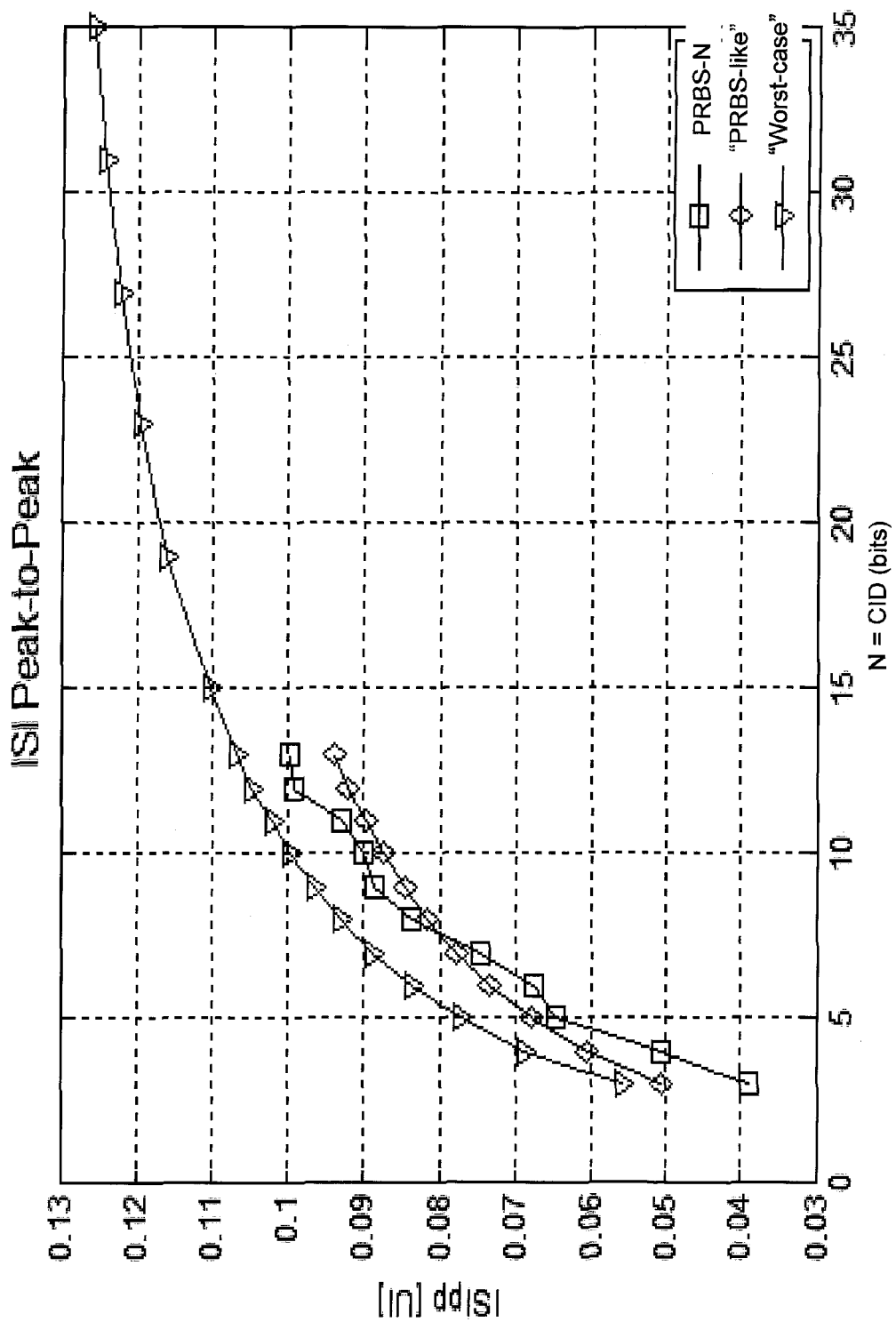
FIG. 13 is an exemplary graph comparing peak-to-peak ISI using a PRBS with peak-to-peak. ISI using ISI inducing short patterns in accordance with an embodiment of the invention.

FIG. 13 is an exemplary graph comparing peak-to-peak ISI using a PRBS with peak-to-peak ISI using ISI inducing short patterns in accordance with an embodiment of the invention. As seen, the "worst-case" short pattern induces the largest peak-to-peak ISI for a given N. Hence, for a given N, the worst-case short pattern generates a maximal level of peak-to-peak ISI.

The PRBS-like short pattern induces a slightly larger peak-to-peak ISI than the PRBS-N pattern for N=3 to 7, and slightly lower peak-to-peak ISI than the PRBS-N pattern for N=8 to 13. Thus, the PRBS-like short pattern induces a similar amount of ISI as a PRBS-N pattern for a given N.

The ISI inducing short patterns disclosed herein provide various benefits and advantages.

First, scalable worst-case patterns are provided for efficient link simulation.

Second, a self-contained die architecture is provided which combines on-die instrument (ODI) circuitry and an ISI inducing short pattern generation algorithm to provide embedded high-speed link diagnostics and correlations between simulation and physical measurement of link performance.

Third, the substantially shorter simulation times using the short patterns enables the simulation of small-probability worst-case ISI scenarios in seconds or minutes, rather than hours or days.

Fourth, a worst-case ISI may be determined, and an associated worst-case eye diagram may be generated, in seconds or minutes, rather than hours or days.

Fifth, the present disclosure makes practical pre-silicon simulation, post-silicon simulation and measurement, and the evaluating their correlations for worst-case scenarios.

Sixth, the short simulation time for worst-case scenarios per the present disclosure enables rapid evaluation of what-if scenarios to determine an optimized link architecture design.

Finally, the present disclosure enables the analysis of different kinds of ISI inducing short patterns, such as worst-case patterns, PRBS-level worst-case (i.e. PRBS-like) patterns, and other similar patterns, and their impact on the link performance.

Figure 14:
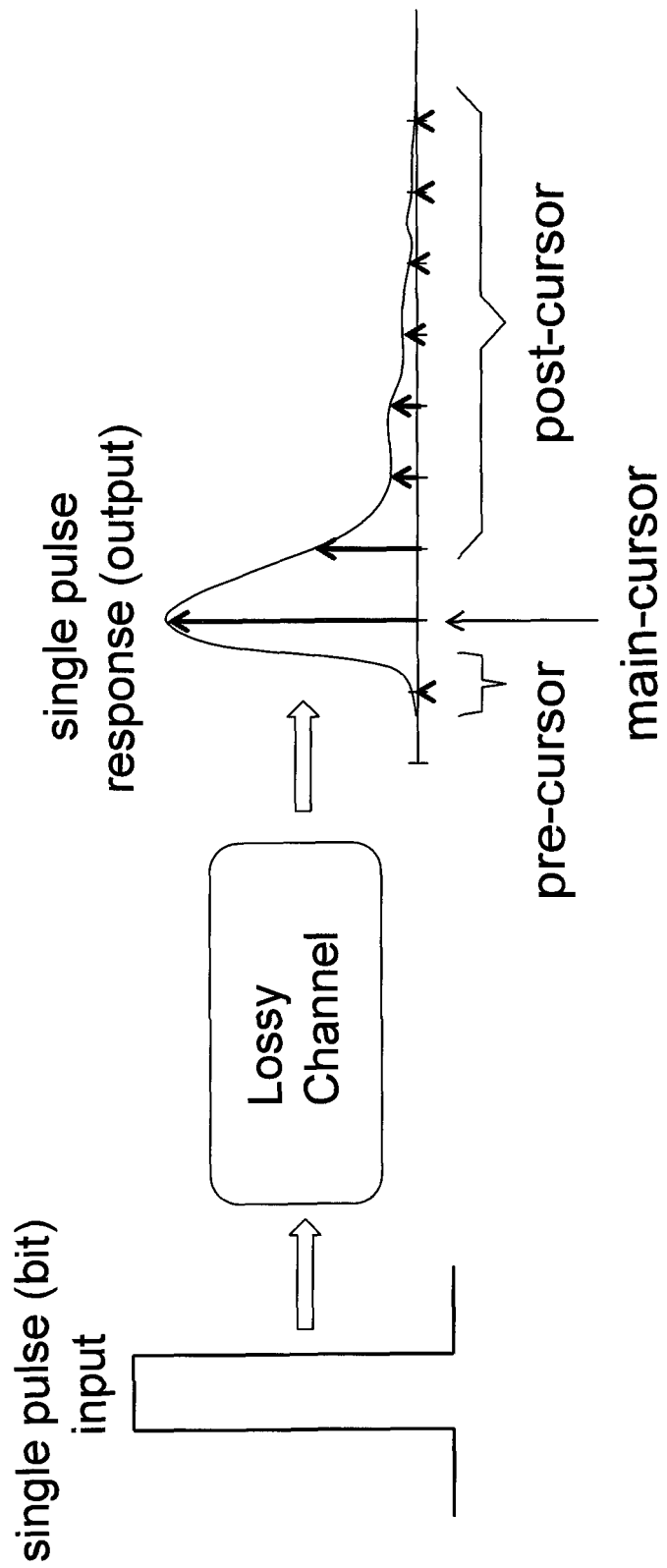
FIG. 14 depicts exemplary cursors of a response to a single bit pulse input in accordance with one embodiment of the present invention.

FIG. 14 depicts exemplary cursors of a response to a single bit pulse input in accordance with one embodiment of the invention. As shown, a single bit pulse is input into a lossy channel, and the single bit pulse response (SBPR) is output from the channel. The single bit pulse input is one unit interval wide. The SBPR includes a main cursor which is defined at the peak of the response. Post-cursor positions are at unit intervals after the main cursor. In this example, there are seven post cursors. A few pre-cursors may also exist at unit intervals before the main cursor.

Figure 15:
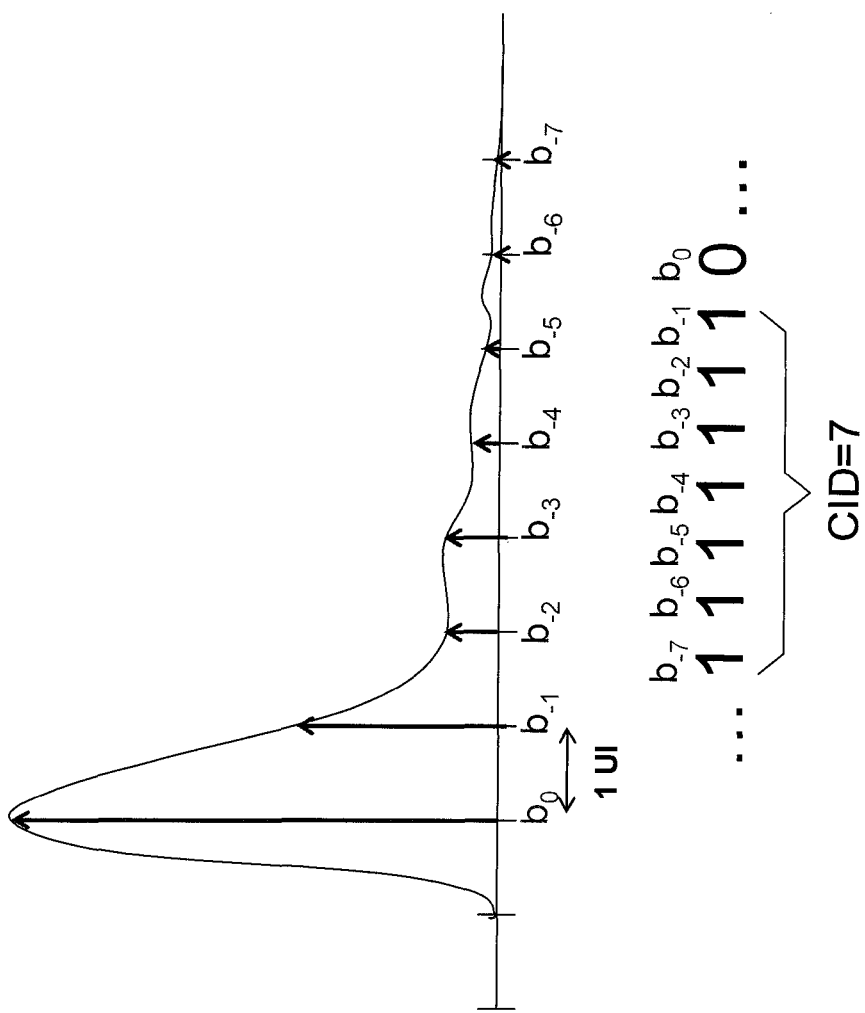
FIG. 15 depicts an ISI-inducing sequence for an example case where all the cursors of the single bit pulse response (SBPR) have a same polarity in accordance with an embodiment of the invention.

FIG. 15 depicts an ISI-inducing sequence for an example case where all the cursors of the SBPR have a same polarity in accordance with an embodiment of the invention. In this case, since all seven of the post-cursors at $b_{-1}$ through $b_{-7}$ have a same (positive) polarity as the main cursor at $b_0$, the "CID" sequence in the ISI-inducing sequence is literally composed of identical bits (digits). In this instance, there are seven identical bits in the CID sequence corresponding to the seven post-cursors, and each bit has a logical value of one (i.e. the CID sequence is "1111111").

Figure 16:
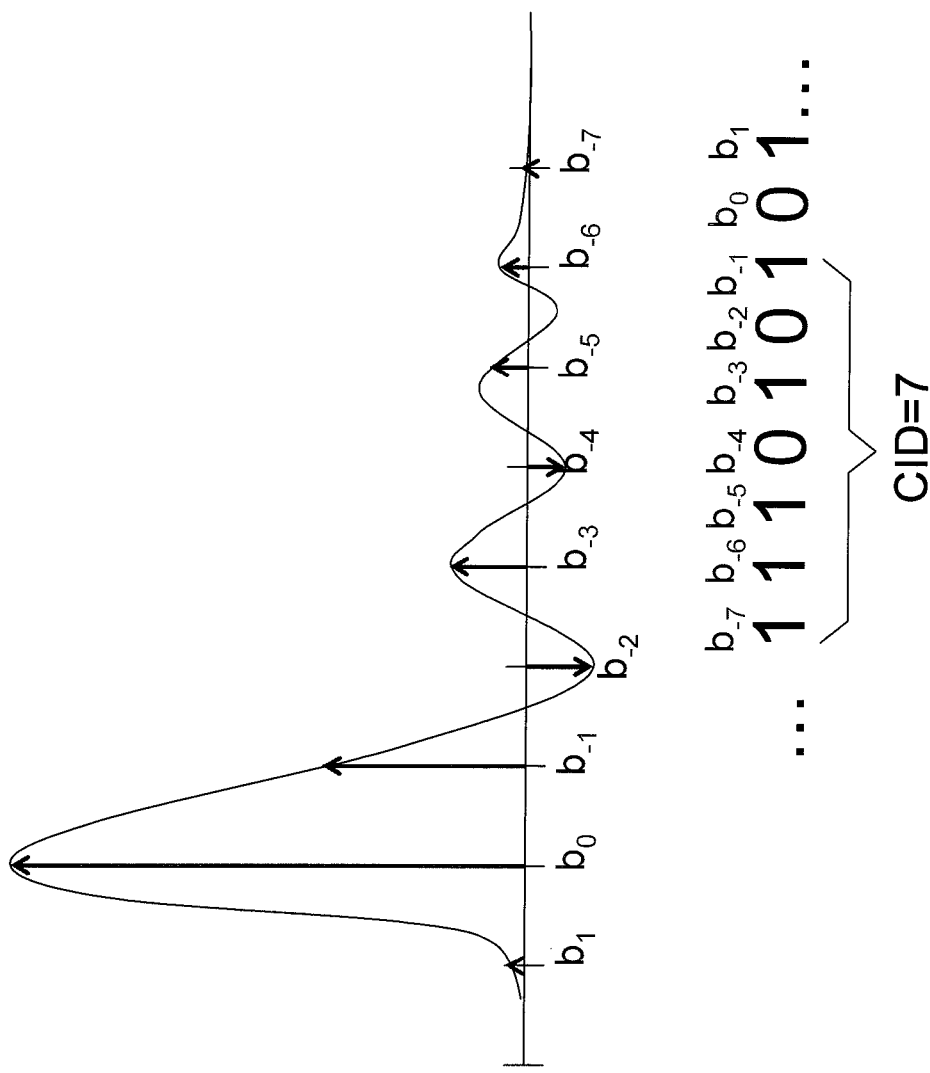
FIG. 16 depicts an ISI-inducing sequence for an example case where not all the cursors of the SBPR have a same polarity in accordance with an embodiment of the invention.

FIG. 16 depicts an ISI-inducing sequence for an example case where not all the cursors of the SBPR have a same polarity in accordance with an embodiment of the invention. In this case, two of the post-cursors (at $b_{-2}$ and $b_{-4}$) have a negative polarity which is opposite to the positive polarity of the main cursor at $b_0$ and the remaining pre-cursors. In this case, the "CID" sequence in the ISI-inducing sequence is actually a consecutive sequence of bits which includes complementary bits that correspond to the post-cursors having the opposite polarity. In this instance, the 7-bit "CID" sequence is "1110101", where the seven bit positions in the sequence represent in order $b_{-7}$ through $b_{-1}$.

Furthermore, the example case of FIG. 16 also includes a pre-cursor at $b_1$ with a positive polarity. The presence of the pre-cursor results in an additional bit added to the end of the ISI-inducing sequence. In this instance, the ISI-inducing sequence is "111010101", where the logical zero at the eight bit position may be considered as corresponding to the main cursor $b_0$, and the logical one at the ninth bit position corresponds to the positive polarity pre-cursor at $b_1$. If the pre-cursor at b1 was, instead, of negative polarity, then the sequence would include a logical zero at the ninth bit position.

Figure 17:
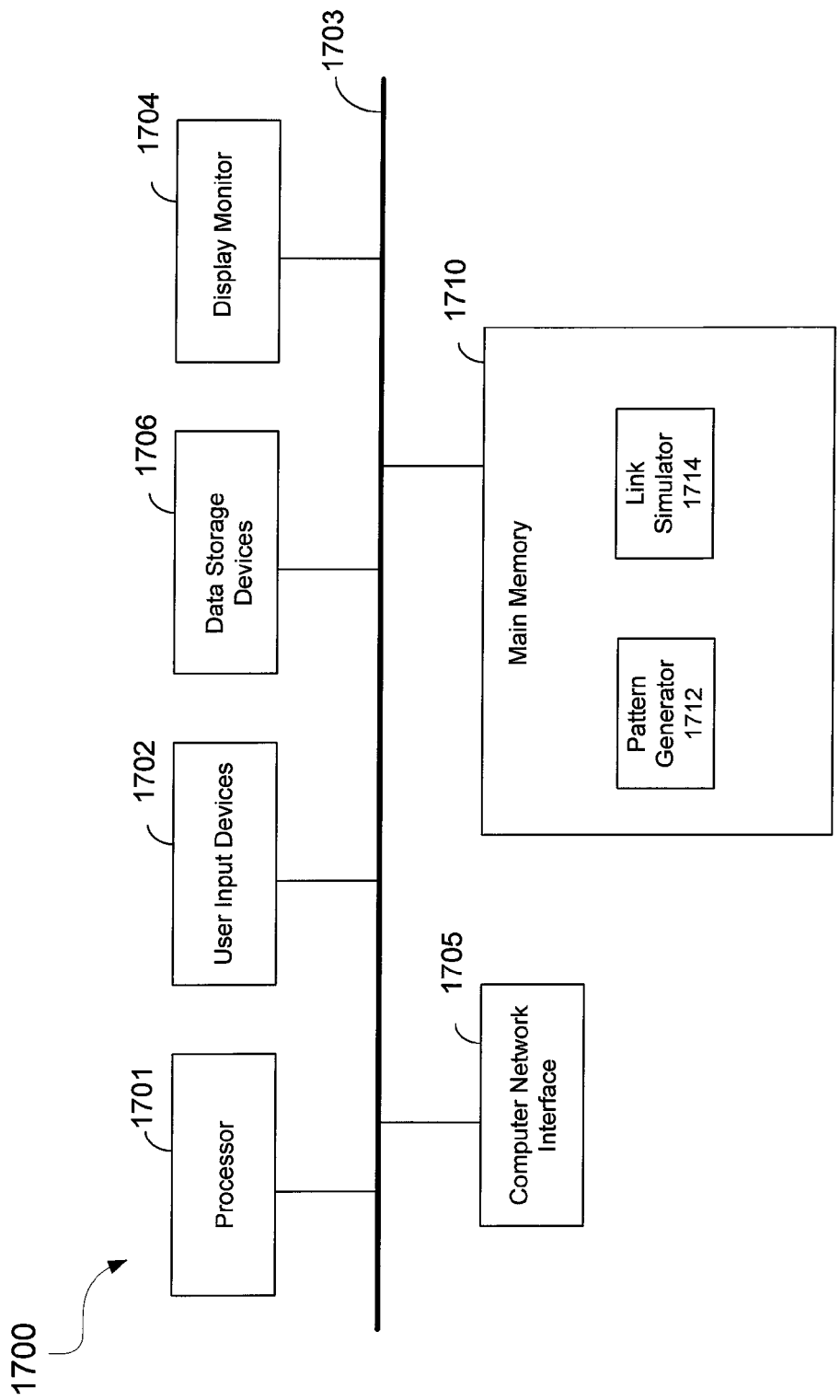
FIG. 17 is a high-level diagram of an example computer apparatus in accordance with an embodiment of the invention.

FIG. 17 is a high-level diagram of an example computer apparatus 1700 in accordance with an embodiment of the invention. The computer apparatus 1700 may be configured with executable instructions so as to perform the data processing methods described herein. This figure shows just one example of a computer which may be used to perform the data processing methods described herein. Many other types of computers may also be employed, such as multi-processor computers, server computers, cloud computing via a computer network, and so forth.

The computer apparatus 1700 may include a processor 1701, such as those from the Intel Corporation of Santa Clara, Calif., for example. The computer apparatus 1700 may have one or more buses 1703 communicatively interconnecting its various components. The computer apparatus 1700 may include one or more user input devices 1702 (e.g., keyboard, mouse), one or more data storage devices 1706 (e.g., hard drive, optical disk, USB memory), a display monitor 1704 (e.g., LCD, flat panel monitor, CRT), a computer network interface 1705 (e.g., network adapter, modem), and a main memory 1710 (e.g., RAM).

In the example shown in this figure, the main memory 1710 includes executable code and data. The executable code may comprise computer-readable program code (i.e., software) components which may be loaded from the data storage device 1706 to the main memory 1710 for execution by the processor 1701. In particular, the executable code may include a data pattern generator module 1712 and a link simulator 1714. In accordance with an embodiment of the invention, the data pattern generator module 1712 may be configured to generate ISI inducing short patterns as described herein, and the link simulator 1714 may be configured to use the ISI inducing short patterns to simulate performance of communication links.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of measuring a performance of a communication link that comprises a transmitter circuit, a receiver circuit, and a communication channel therebetween, the method comprising:

generating, by a pattern generator circuit, an inter-symbol interference inducing short pattern comprising:
a binary clock sequence comprising a plurality of bits of alternating values;
a first inter-symbol interference inducing binary sequence to follow the binary clock sequence in order within the inter-symbol interference inducing short pattern, wherein the first inter-symbol interference inducing binary sequence comprises repeating a first series of consecutive identical bits of a first value followed in order by one bit of a second value a plurality of times, wherein the first and second values are inverses of each other; and
a second inter-symbol interference inducing binary sequence that follows the complement of the binary clock sequence in order within the inter-symbol interference inducing short pattern, wherein the second inter-symbol interference inducing binary sequence comprises repeating a second series of consecutive identical bits of the second value followed in order by one bit of the first value a plurality of times;
transmitting, by the transmitter circuit, the inter-symbol interference inducing short pattern to the communication channel;
receiving, by the receiver circuit, the inter-symbol interference inducing short pattern from the communication channel; and
measuring the performance of the communication link to obtain measured performance data.

2. The method of claim 1, wherein the binary clock sequence is an odd number of bits long and begins with a bit of the second value, and wherein the method further comprises:
generating a single bit of the first value between the first and second inter-symbol interference inducing binary sequences.

3. The method of claim 1, wherein a series length is a length in bits of the first series of consecutive identical bits, and wherein the plurality of repetitions is greater than or equal to a nearest integer which is greater than or equal to the clock length divided by one more than the series length.

4. The method of claim 1, further comprising:
generating a complement of the binary clock sequence between the first and second inter-symbol interference inducing binary sequences.

5. The method of claim 4, wherein the binary clock sequence is an odd number of bits long and begins with a bit of the second value.

6. The method of claim 5, wherein a clock length is a length in bits of the binary clock sequence, wherein a series length is a length in bits of the first series of consecutive identical bits, and wherein the plurality of repetitions is greater than or equal to a nearest integer which is greater than or equal to the clock length divided by one more than the series length.

7. The method of claim 1, further comprising:
storing the inter-symbol interference inducing short pattern in a data storage device; and
using the inter-symbol interference inducing short pattern in a computer-implemented simulation of the communication link to determine simulated performance data.

8. The method of claim 7, further comprising:
correlating the simulated performance data and measured performance data.

9. The method of claim 1, further comprising:
determining polarities of post-cursors of a single bit pulse response (SBPR) of a lossy channel of the link; and
using the polarities to set the first value.

10. The method of claim 9, wherein the first inter-symbol interference inducing binary sequence further comprises, after the single bit, one or more bits corresponding to pre-cursors of the single bit pulse response.

11. A transmitter circuit comprising:
a serializer;
a transmitter equalizer;
a driver that outputs a data signal to a communication link; and
a pattern generator circuit for generating an inter-symbol interference inducing short pattern that is provided to the serializer for testing the communication link, the pattern generator circuit comprising circuitry that generates
a binary clock sequence comprising bits of alternating values, wherein the binary clock sequence has a clock length in bits that is greater than or equal to a channel settling time divided by one bit duration, and wherein the clock length is at least seven and less than one thousand bits,
a first inter-symbol interference inducing binary sequence following the binary clock sequence in order within the inter-symbol interference inducing short pattern, and
a second inter-symbol interference inducing binary sequence following the first inter-symbol interference inducing binary sequence in order within the inter-symbol interference inducing short pattern.

12. The transmitter circuit of claim 11, wherein the transmitter circuit is in an integrated circuit.

13. The transmitter circuit of claim 11, wherein generation of the first inter-symbol interference inducing binary sequence comprises:
repeating for a plurality of repetitions a series of consecutive identical bits of a first value followed by one bit of a second value, wherein the first and second values are inverses of each other.

14. The transmitter circuit of claim 11, wherein the circuitry is further configured to generate a complement of the binary clock sequence between the first and second inter-symbol interference inducing binary sequences.

15. The transmitter circuit of claim 11, wherein the first inter-symbol interference inducing binary sequence comprises a consecutive sequence of bits whose values are pre-determined in relation to polarities of post-cursors of a single bit pulse response of a lossy channel of the link, followed by a single bit, then followed by one or more bits in relation to polarities of pre-cursors.

* * * * *